(No Model.)
A. O. KITTREDGE & B. ADRIANCE.
SHEET METAL SCROLL CUTTER.
No. 383,398. Patented May 22, 1888.
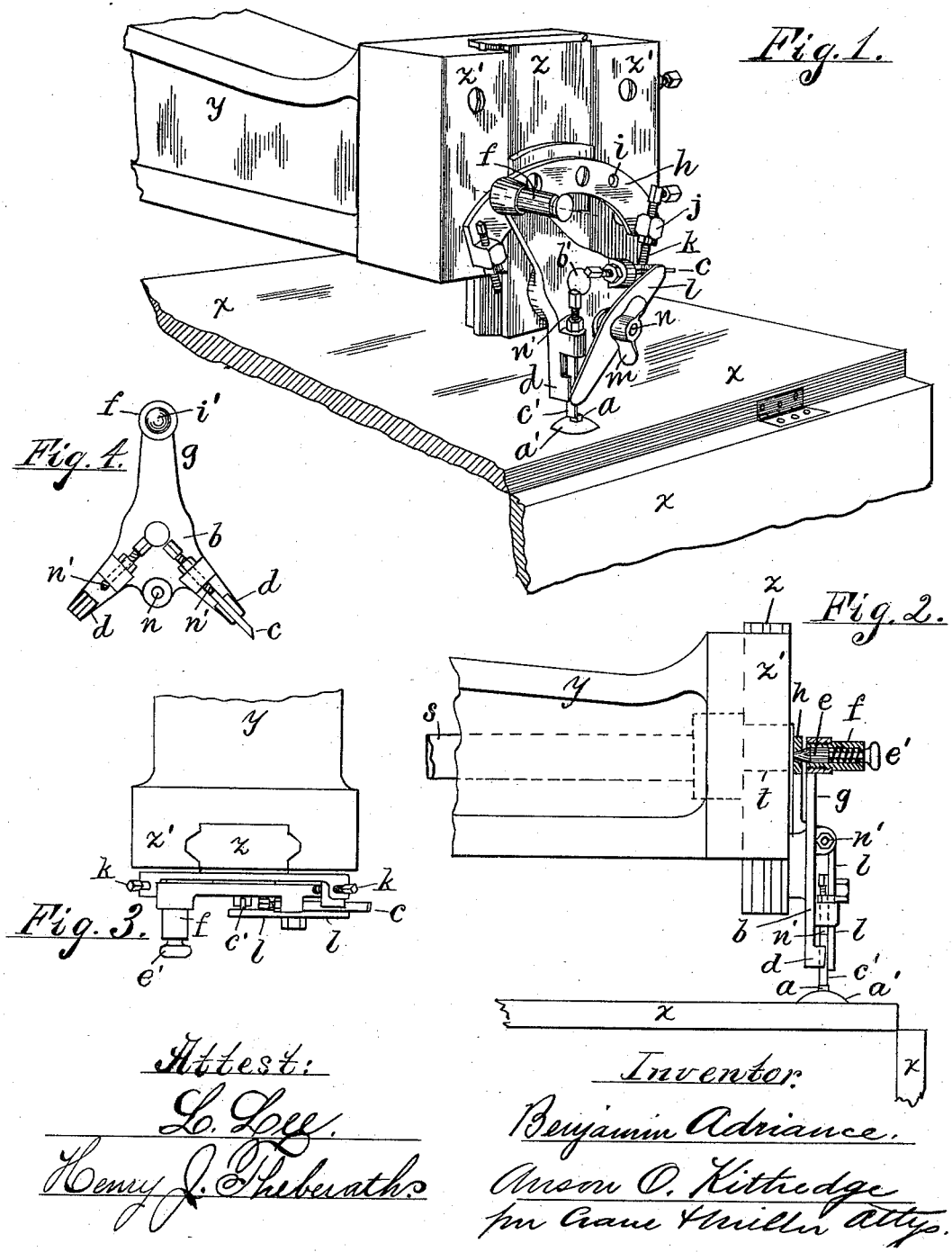
Attest:
L. Lee.
Henry J. Theberath.
Inventor:
Benjamin Adriance.
Anson O. Kittredge
per Crane & Miller, Attys.

UNITED STATES PATENT OFFICE.

ANSON O. KITTREDGE, OF SLATE HILL, AND BENJAMIN ADRIANCE, OF BROOKLYN, NEW YORK, ASSIGNORS TO THE VULCAN COMPANY, OF PENNSYLVANIA.

SHEET-METAL-SCROLL CUTTER.

SPECIFICATION forming part of Letters Patent No. 383,398, dated May 22, 1888.

Application filed October 11, 1887. Serial No. 252,062. (No model.)

*To all whom it may concern:*

Be it known that we, ANSON O. KITTREDGE and BENJAMIN ADRIANCE, citizens of the United States, residing, respectively, at Slate Hill, Orange county, New York, and Brooklyn, Kings county, New York, have invented certain new and useful Improvements in Double-Knife Scroll-Cutters for Sheet Metal, fully described and represented in the following specification and the accompanying drawings, forming a part of the same.

The object of this invention is to cut sheet metal upon either side of a marked line in the art of making sheet-metal cornices and wares of every description. To effect this object we employ a stationary lower tool formed with right and left hand corners, to operate in conjunction with separate reciprocating cutters, and we mount two cutters upon a reciprocating slide or head in such manner that either cutter may at pleasure be adjusted in line with one of the corners of the lower tool and operate therewith to shear the sheet metal.

Our invention also consists, partly, in means for holding the respective cutters upon their carrier, and in means for shifting either one of said cutters in line with the lower tool and for locking it in the desired position upon the reciprocating head, so as to be moved thereby in contact with one side of the lower tool.

The separate cutters will be described herein as the right-hand and left-hand cutters; but as the object of the invention is merely to furnish a means for cutting at pleasure upon either side of a marked line, it is obvious that the opposite edges of the lower tool may be formed on the front and rear sides thereof, or at any intermediate angle, provided the upper cutters be adjusted in line with the same and the metal be fed toward the cutters in a line with their cutting-edges.

In the drawings we have shown the reciprocating head as a vertically-moving slide and the carrier for the right and left hand tools pivoted upon its front side; but it is obvious that other forms of reciprocating head and carrier may be substituted with the same effect.

In the drawings, Figure 1 is a perspective view of portion of the work-table and the front end of a goose-neck overhanging the same and carrying the reciprocating head, the means for moving the latter up and down being only indicated herein, as their nature and operation are already well known. In this figure the left-hand corner is shown in contact with the lower tool. Fig. 2 is a side elevation of the parts shown in Fig. 1, with the spring-bolt and its socket and guard in section on line *o o* in Fig. 1. Fig. 3 is a plan of the front end of the goose-neck, with the reciprocating head and the parts mounted thereon; and Fig. 4 is a front view of the tool-carrier detached from the head and the button removed.

$x$ is a table with its front part hinged to afford closer access to the tools when desired.

$y$ is the front end of a goose-neck projected over the table and carrying at its forward end a cutter-head, $z$, fitted in vertical guides $z'$.

$a$ is the lower tool, (shown of rectangular form,) mounted in a convex boss, $a'$, which is projected slightly above the table to permit the application of the operator's fingers to the edges of the sheet metal.

$b$ is an upper tool-carrier, pivoted at $b'$ upon the front of the reciprocating head $z$ and over the tool $a$, and provided with holders $d$ to carry the right and left hand cutters $c$ and $c'$. These holders radiate from the pivot $b'$, so that when the carrier is turned with either holder downward the cutter held therein will bear upon the required side of the tool $a$. To bring either cutter into action, it is therefore only necessary to tip the carrier to bring such cutter in contact with the lower tool, and to lock the carrier in such position upon the head $z$. Such locking is effected by a spring-bolt, $e$, fitted through a socket, $f$, upon an arm, $g$, attached to the carrier, and a guard, $h$, is provided upon the head $z$, with holes $i$ to receive the point of the bolt, which is tapered to press the arm sidewise as it enters the nearer edge of such holes. The bolt is operated by a knob, $i'$, which compresses the spring within the socket $f$. The guard is shown of arc shape to combine it conveniently with ears $j$, through which set-screws $k$ are inserted to adjust the cutters against the sides of the lower tool by contact with the opposed holder. The holes $i$ are so located in the guard that to press the bolt wholly therein the cutter would be forced past the operative edge of the tool *a*. The tendency of the tapering point upon the bolt is therefore to crowd the cutter toward the side of the lower tool, and the set-screws *k* are opposed to such movement, and serve, by protruding more or less from the lug *j*, to arrest the carrier and to thus adjust the tool accurately to the nearer corner of the tool *a*.

In Fig. 1 the right-hand screw is thus shown in contact with one of the holders *d* and the cutter *c'* adjusted in contact with the left-hand side of the tool *a*. The holders are provided each with an open groove, in the front of which the tool is laid and held upon a button, *l*, which is pressed upon the same by a nut, *m*, applied to a stud, *n*, inserted in the carrier between the two holders.

The loosening of the nut permits the rotation of the button to release it from the cutters, and they may thus be readily moved for shifting, or replaced with others of different character. The lower tool, *a*, may also be made removable in any convenient manner.

Set-screws *n'* are inserted in the carrier above the end of each tool to adjust it vertically within the holder, and the lap of each cutter upon the lower tool may thus be separately effected.

The means for rotating the head *z* is shown herein as an eccentric-shaft, *s*, fitted longitudinally to a bearing in the gooseneck, and provided at its outer end with an eccentric-pin, *t*, which serves to move the head in the manner common in punching and shearing presses of various kinds. The sliding box usually fitted to such eccentric-pin within a transverse slot in the head is not shown herein, as its nature is already well known.

A seat is formed upon the head *z* to receive the arc-shaped piece *h*, termed herein a "guard;" but such piece is not an essential element of our invention, as the holes for the stop-bolt may be formed directly in the head, and the set-screws *k*, which adjust the cutters against the side of the lower tool, may be otherwise applied to the carrier.

We have in certain instances fitted the two cutters in vertical grooves formed directly in the lower end of the reciprocating head, with a space between them just equal to the width of the lower tool. Either cutter in such construction could be slipped downward into contact with one side of the lower tool and held in such position by a clamping device in the head.

From the above description the essential features of our invention will be understood, and it will be seen that its construction may be materially modified without departing from the invention.

Having thus set forth our invention, what we claim herein is—

1. In a sheet-metal-cutting machine, the combination, with a stationary lower tool, of a reciprocating head, two reciprocating cutters mounted movably upon said head, and means for adjusting them separately to the opposite sides of the lower tool, as and for the purpose set forth.

2. In a sheet-metal-cutting machine, the combination, with a stationary lower tool having opposite cutting-edges, of a reciprocating head, two reciprocating cutters mounted movably upon said head, and means for adjusting them separately to the opposite sides of the lower tool, as and for the purpose set forth.

3. In a sheet-metal-cutting machine, the combination, with a stationary lower tool, of a reciprocating head, a tool-carrier pivoted thereon, two cutters held upon said carrier, and means for shifting the carrier to adjust said cutters to opposite sides of the lower tool, as and for the purpose set forth.

4. In a sheet-metal-cutting machine, the combination, with a stationary lower tool, of a reciprocating head, a tool-carrier pivoted thereon, two cutters held upon said carrier, a taper-pointed bolt upon said carrier, holes in a guard upon the head to fit the point of said bolt, and screws *k*, for setting the cutters in contact with the side of the lower tool.

5. In a sheet-metal-cutting machine, the combination, with a stationary lower tool, of a reciprocating head, a tool-carrier pivoted thereon, two cutters held upon said carrier, and means for shifting the carrier to adjust said cutters to opposite sides of the lower tool, the cutters being held upon the carrier in open-grooved holders, and the carrier being provided with set-screws to adjust the cutters vertically, and a button to clamp each cutter in its holder, the whole being arranged and operated substantially as shown and described.

In testimony whereof we have hereunto set our hands in the presence of two subscribing witnesses.

ANSON O. KITTREDGE.
BENJ. ADRIANCE.

Witnesses:
GEO. S. HICKOK,
DE WITT C. HOLBROOK.